(12) United States Patent
Ryoki et al.

(10) Patent No.: US 11,652,940 B2
(45) Date of Patent: May 16, 2023

(54) PHOTOELECTRIC CONVERSION DEVICE AND METHOD OF CONTROLLING PHOTOELECTRIC CONVERSION DEVICE

(71) Applicant: CANON KABUSHIKI KAISHA, Tokyo (JP)

(72) Inventors: Tatsuya Ryoki, Kanagawa (JP); Naoki Isoda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/689,717

(22) Filed: Mar. 8, 2022

(65) Prior Publication Data

US 2022/0294922 A1    Sep. 15, 2022

(30) Foreign Application Priority Data

Mar. 10, 2021   (JP) .............................. JP2021-038417

(51) Int. Cl.
*H04N 1/04*       (2006.01)
*H04N 1/00*       (2006.01)
*H04N 1/028*      (2006.01)

(52) U.S. Cl.
CPC ..... *H04N 1/00822* (2013.01); *H04N 1/00933* (2013.01); *H04N 1/02805* (2013.01)

(58) Field of Classification Search
None
See application file for complete search history.

(56) References Cited

U.S. PATENT DOCUMENTS

| | | | |
|---|---|---|---|
| 9,305,946 B2* | 4/2016 | Ryoki | H04N 5/347 |
| 9,344,652 B2* | 5/2016 | Itano | H04N 5/378 |
| 2011/0285893 A1* | 11/2011 | Sakai | H04N 5/3765 |
| | | | 348/324 |
| 2013/0214131 A1* | 8/2013 | Yamashita | H04N 5/343 |
| | | | 250/208.1 |
| 2013/0221199 A1* | 8/2013 | Kato | H04N 5/3692 |
| | | | 250/208.1 |
| 2015/0172581 A1* | 6/2015 | Itano | H04N 5/37455 |
| | | | 250/208.1 |

FOREIGN PATENT DOCUMENTS

| | | |
|---|---|---|
| JP | 2003504972 A | 2/2003 |
| JP | 2007049315 A | 2/2007 |
| JP | 2012060493 A | 3/2012 |
| JP | 2018117264 A | 7/2018 |
| WO | 0105139 A1 | 1/2001 |

* cited by examiner

*Primary Examiner* — Dung D Tran
(74) *Attorney, Agent, or Firm* — Canon U.S.A., Inc. IP Division (57) ABSTRACT

There is provide a photoelectric conversion device. In a first mode, a control unit performs control such that a signal output from each of a plurality of pixels is held in a corresponding holding unit. In a second mode, the control unit performs control of outputting a signal from the holding unit corresponding to a pixel in a first column and control of holding a signal based on a pixel in the first column in the holding unit corresponding to a pixel in a second column in parallel in the same period.

20 Claims, 10 Drawing Sheets

PHOTOELECTRIC CONVERSION DEVICE AND METHOD OF CONTROLLING PHOTOELECTRIC CONVERSION DEVICE

BACKGROUND

Field of the Disclosure

The aspect of the embodiments relates to a photoelectric conversion device and a method of controlling the photoelectric conversion device.

Description of the Related Art

Japanese Patent Application Laid-Open No. 2012-60493 discloses an image reading device including three line sensors. The image reading device disclosed in Japanese Patent Application Laid-Open No. 2012-60493 includes color filters arranged on optical paths from a document to three line sensors and can read color information of red (R), green (G), and blue (B).

In this device configuration, the document and the line sensors mechanically move relative to each other in the sub-scanning direction orthogonal to the main scanning direction in which the line sensors extend, thereby reading an image. At this time, a positional deviation may occur in the image signals of the respective colors due to a difference in physical distance between the pixels of the respective colors R, G, and B. Japanese Patent Application Laid-Open No. 2012-60493 discloses correcting the positional deviation for each color by changing a light accumulation timing of a line sensor for each color in accordance with a correction parameter.

Due to constraints of the device configuration and the like, there is a possibility that a method of correcting the positional deviation at the time of scanning is required by a method different from that in Japanese Patent Application Laid-Open No. 2012-60493.

SUMMARY OF THE DISCLOSURE

According to an aspect of the embodiments, there is provided a photoelectric conversion device including a pixel array including a plurality of pixels each outputting a signal corresponding to incident light and arranged in a plurality of columns in a first direction, a holding unit arranged corresponding to each of the plurality of pixels; and a control unit that at a timing synchronized with a relative position between the plurality of pixels and an imaging target in a second direction orthogonal to the first direction, performs control of reading signals from the plurality of pixels and holding them in the holding unit and control of outputting a signal from the holding unit. The control unit is configured to perform control in either a first mode or a second mode. In the first mode, the control unit performs control such that a signal output from each of the plurality of pixels is held in the corresponding holding unit. In the second mode, the control unit performs control of outputting a signal from the holding unit corresponding to a pixel in a first column and control of holding a signal based on a pixel in the first column in the holding unit corresponding to a pixel in a second column in parallel in a same period.

According to another aspect of the embodiments, there is provided a method of controlling a photoelectric conversion device including a pixel array including a plurality of pixels each outputting a signal corresponding to incident light and arranged in a plurality of columns in a first direction and a holding unit arranged corresponding to each of the plurality of pixels, the method including at a timing synchronized with a relative position between the plurality of pixels and an imaging target in a second direction orthogonal to the first direction, reading signals from the plurality of pixels and holding them in the holding unit and outputting a signal from the holding unit. The photoelectric conversion device performs control in either a first mode or a second mode. In the first mode, a signal output from each of the plurality of pixels is held in the corresponding holding unit. In the second mode, outputting a signal from the holding unit corresponding to a pixel in a first column and holding a signal based on a pixel in the first column in the holding unit corresponding to a pixel in a second column are performed in parallel in a same period.

Further features of the disclosure will become apparent from the following description of exemplary embodiments with reference to the attached drawings.

DESCRIPTION OF THE EMBODIMENTS

Exemplary embodiments of the disclosure will now be described in detail in accordance with the accompanying drawings. In the drawings, the same or corresponding elements are denoted by the same reference numerals, and the description thereof may be omitted or simplified.

First Embodiment

Figure 1:
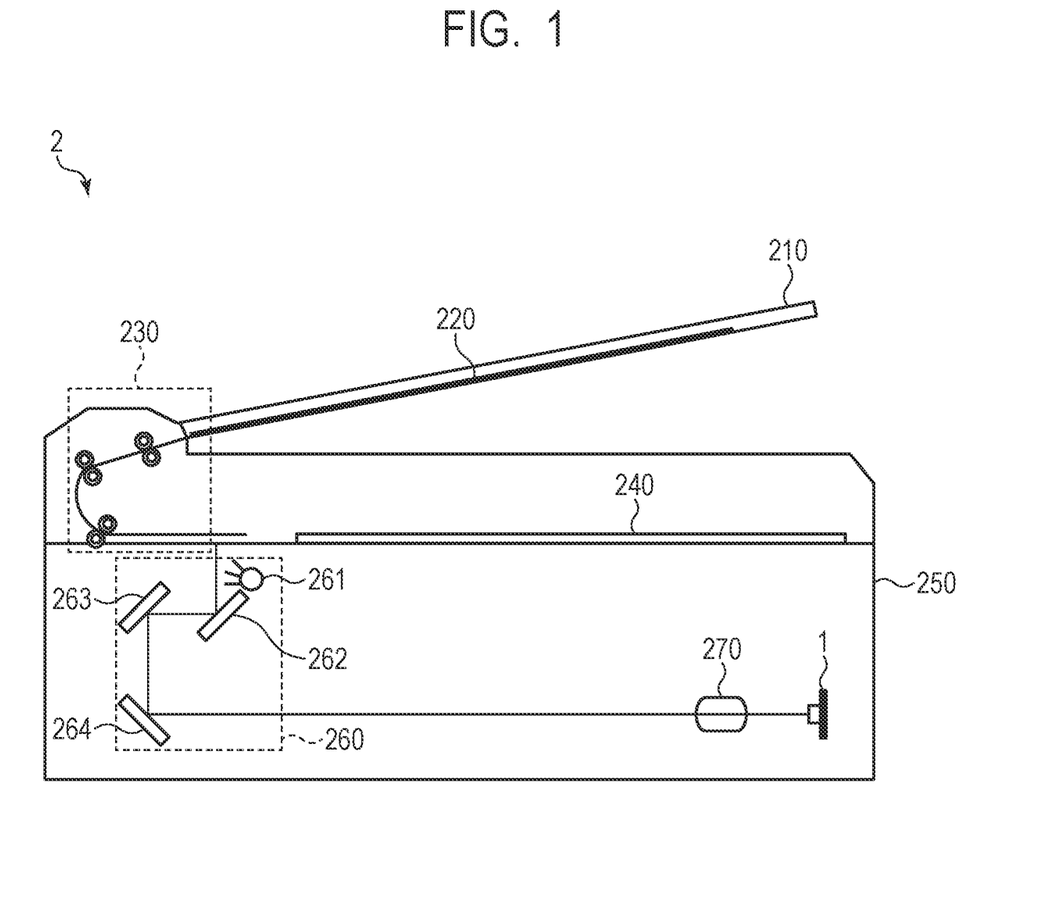
FIG. 1 is a schematic diagram illustrating a schematic configuration of an image reading device according to a first embodiment.

FIG. 1 is a schematic diagram illustrating a schematic configuration of an image reading device 2 according to the present embodiment. The image reading device 2 includes a document tray 210, an automatic document feeder 230, a document table 240, and a main body 250. The document tray 210 and the document table 240 are portions on which a user places a document 220 as an imaging target. The automatic document feeder 230 feeds the document 220 placed on the document tray 210.

The main body 250 includes a mirror unit 260, a lens 270, and a photoelectric conversion device 1. The mirror unit 260 includes a lamp 261 and mirrors 262, 263, and 264. The lamp 261 is a light source that irradiates a surface of the fed document 220 (reading surface) with light. The mirrors 262, 263, and 264 guide the reflected light from the document 220 to the lens 270. The lens 270 focuses light on the photoelectric conversion device 1. That is, the mirrors 262, 263, and 264 and the lens 270 are optical systems that guide the reflected light from the document to the photoelectric conversion device 1. The mirror unit 260 is configured to change a relative position with respect to the document 220. The photoelectric conversion device 1 performs imaging based on incident light at a timing synchronized with the relative position, whereby the reading surface of the document 220 can be scanned.

The photoelectric conversion device 1 is a line sensor having pixel rows that receive red (R), green (G), and blue (B) light. Each pixel of the photoelectric conversion device 1 acquires a color image of the document 220 by converting incident light into an electric signal for each color.

The image reading device 2 can read an image of the document 220 in two modes, a document fixing mode and a document feeding mode. The document fixing mode is a mode in which the image reading device 2 reads the document 220 placed on the document table 240. In the document fixing mode, scanning for reading is performed by moving the mirror unit 260 with respect to the fixed document 220. The document feeding mode is a mode in which the image reading device 2 reads the document 220 fed by the automatic document feeder 230. In the document feeding mode, the automatic document feeder 230 moves the document 220 with respect to the mirror unit 260 in a stopped state, thereby performing scanning for reading. In either mode, scanning for reading is performed by changing the relative positions of the mirror unit 260 and the document 220.

Figure 2:
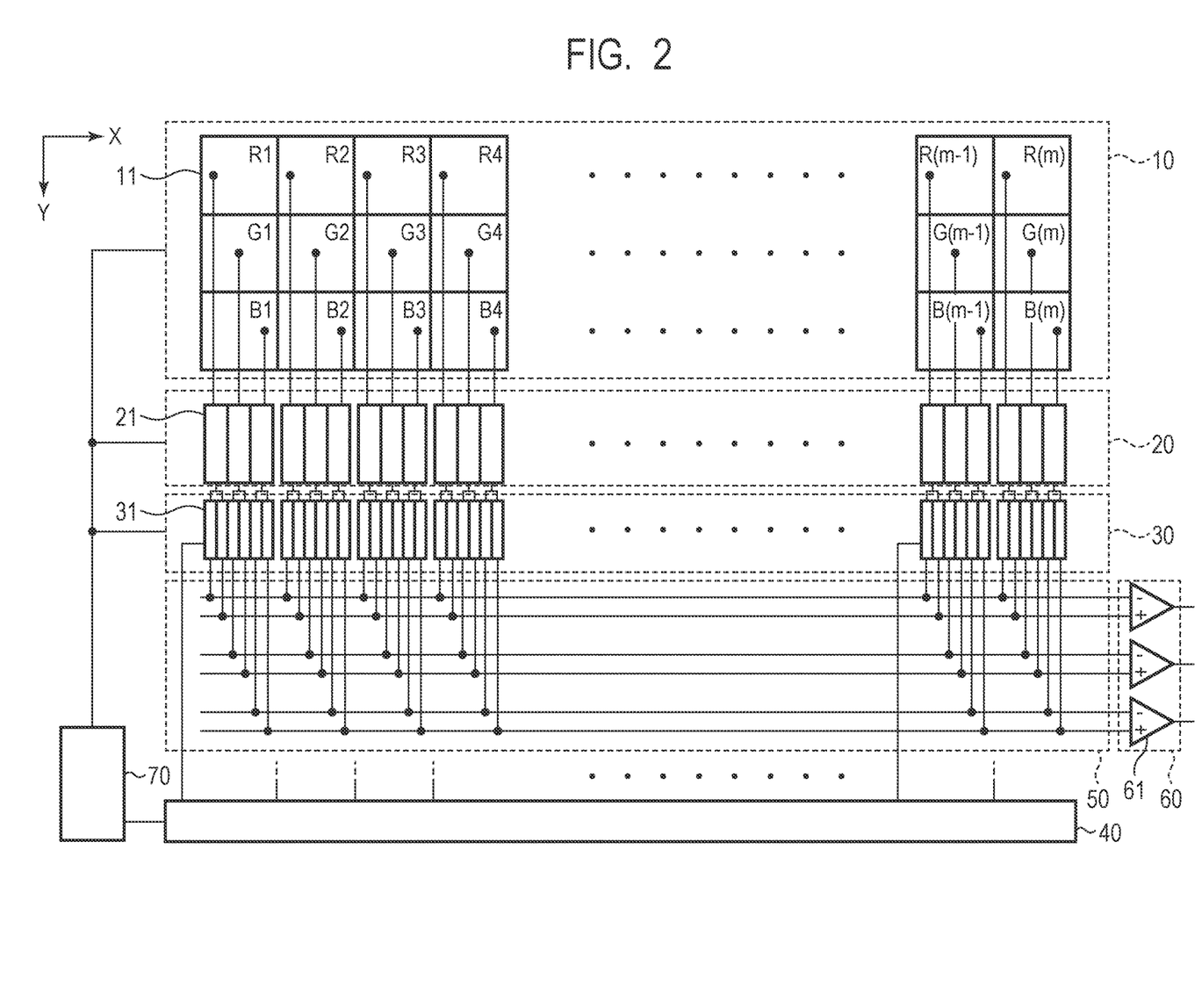
FIG. 2 is a block diagram illustrating a schematic configuration of a photoelectric conversion device according to the first embodiment.

Next, the configuration of the photoelectric conversion device 1 will be described in more detail. FIG. 2 is a block diagram illustrating a schematic configuration of the photoelectric conversion device 1 according to the present embodiment. The photoelectric conversion device 1 includes a pixel array 10, a column circuit unit 20, a memory unit 30, a horizontal scanning circuit 40, a common output line 50, an output unit 60, and a control unit 70.

The pixel array 10 includes a plurality of pixels 11 arranged in a plurality of columns in the main scanning direction X (first direction) and in a plurality of rows in the sub-scanning direction Y (second direction) orthogonal to the main scanning direction X. Each of the plurality of pixels 11 includes a photoelectric conversion unit constituted by a photodiode or the like, and outputs a signal corresponding to incident light. In FIG. 2, the pixel array 10 has three rows and m columns (m is an integer of two or more). As illustrated in FIG. 2, in the first row, pixels 11 having red (R) color filters (R1 to R (m)) are arranged along the main scanning direction X. In the second row, pixels 11 having green (G) color filters (G1 to G (m)) are arranged along the main scanning direction X. In the third row, pixels 11 having blue (B) color filters (B1 to B (m)) are arranged along the main scanning direction X. The number of rows, the number of columns, and the arrangement order of the colors in the pixel array 10 are not limited to those illustrated in FIG. 2.

The interval between the pixels 11 in the main scanning direction X (for example, the interval between the pixels 11 labeled R1 and R2) is 42 μm, for example. The interval between the pixels 11 in the sub-scanning direction Y (for example, the interval between the pixels 11 labeled R1 and G1) is 42 μm in the same way, for example. That is, the physical resolutions in the main scanning direction X and the sub-scanning direction Y may be the same. In this case, a color image having a resolution of 600 dpi can be generated by reading the document 220. Note that the above-described pixel interval and resolution are merely examples, and the present disclosure is not limited thereto.

The column circuit unit 20 includes column circuits 21 arranged corresponding to each of the plurality of pixels 11. The column circuit 21 reads signals from the pixel 11 and outputs the signal to the memory unit 30. The column circuit 21 performs processing such as removing kTC noise generated when the pixels 11 are driven and performing signal amplification. The memory unit 30 includes a holding unit 31 arranged corresponding to each of the plurality of column circuits 21. The holding unit 31 holds the signal output from the column circuit 21. In FIG. 2, two holding units 31 are illustrated corresponding to one pixel 11, and these indicate a holding unit 31 for a pixel signal for holding a pixel signal based on incident light and a holding unit 31 for a reset signal for holding a reset signal based on a reset state of the pixel 11.

The horizontal scanning circuit 40 controls the memory unit 30 to sequentially output the held signals to the common output line 50. The horizontal scanning circuit 40 may be constituted by a shift register or an address decoder. The common output line 50 includes six signal lines each connected to a plurality of holding units 31. The six signal lines transmit pixel signals of R and reset signals, pixel signals of G and reset signals, and pixel signals of B and reset signals, respectively. The output unit 60 includes three differential amplifiers 61 corresponding to three colors of R, G, and B. A pixel signal of a corresponding color and a reset signal are input to the differential amplifier 61, and a signal based on a difference thereof is output to the outside. The control unit 70 controls the operation timing of the pixel array 10, the column circuit unit 20, the memory unit 30, and the horizontal scanning circuit 40.

Figure 3:
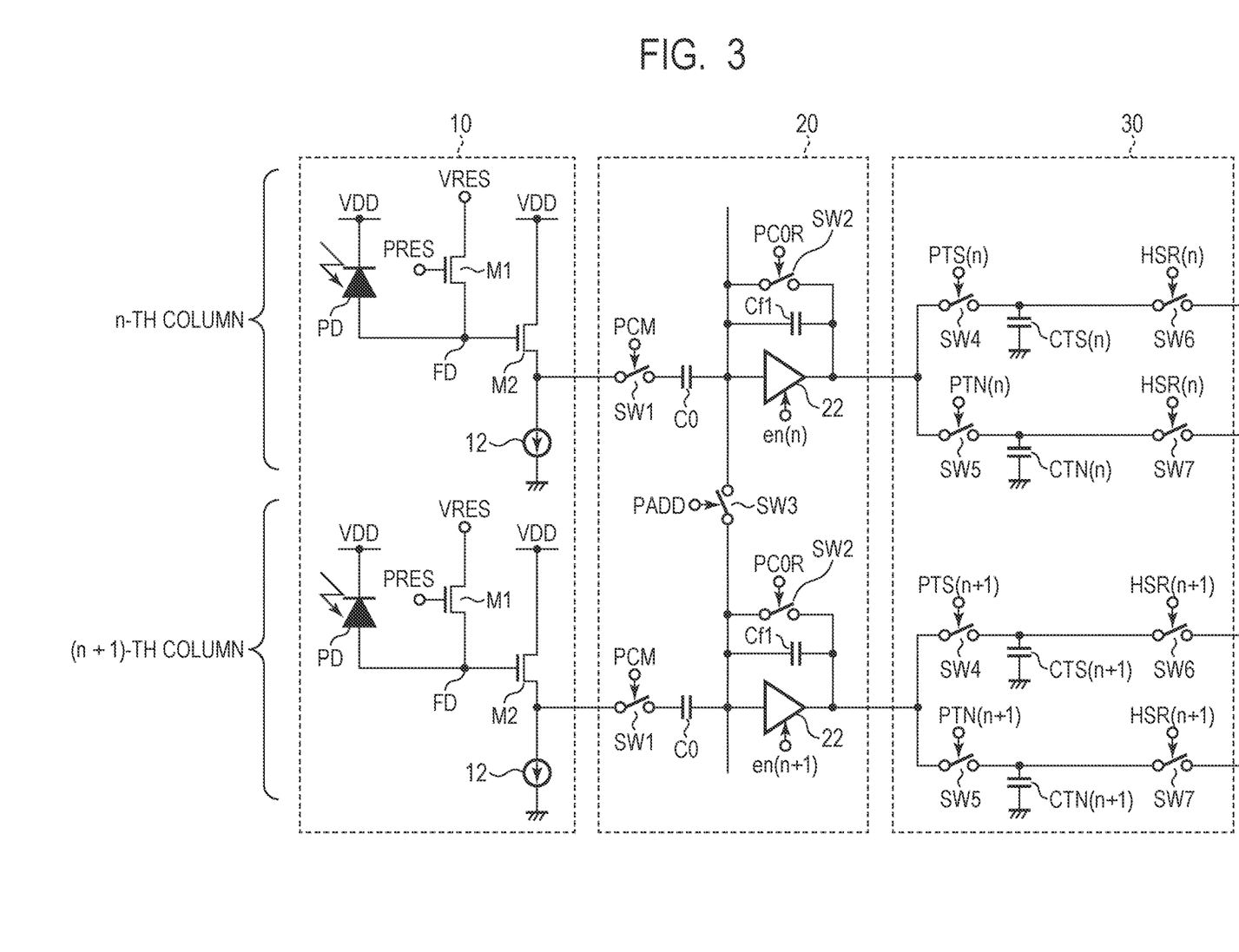
FIG. 3 is a circuit diagram illustrating a configuration of a pixel array, a column circuit unit, and a memory unit according to the first embodiment.

FIG. 3 is a circuit diagram illustrating a configuration of the pixel array 10, the column circuit unit 20, and the memory unit 30 according to the present embodiment. In FIG. 3, the configuration of two columns of circuits corresponding to the pixels 11 of R arranged in the n-th column and the (n+1)-th column (that is, R (n) and R (n+1) in FIG. 2) among the circuits included in these blocks is extracted and illustrated (n is an integer greater than or equal to one and less than or equal to (m−1)). Although omitted in FIG. 3, circuits of the pixel array 10, the column circuit unit 20, and the memory unit 30 corresponding to other columns or other colors have the same configuration. In the following description of FIG. 3, the configuration of the n-th column will be described unless otherwise specified, and description of the (n+1)-th column will be omitted when it is common to the n-th column. Note that in the various control signals illustrated in FIG. 3, a plurality of columns to which different potentials can be individually applied may be given a column number such as en (n).

The pixel array 10 includes a photoelectric conversion unit PD, a reset transistor M1, an amplifying transistor M2, and a current source 12. These transistors can be constituted by N-type MOS transistors each having a gate electrode as a control electrode. A control signal PRES is input to the gate of the reset transistor M1 from the control unit 70.

The photoelectric conversion unit PD is a photoelectric conversion element that generates electric charges corresponding to incident light by photoelectric conversion and accumulates the electric charges. The photoelectric conversion unit PD may be constituted by a photodiode formed in a semiconductor substrate. The cathode of the photodiode constituting the photoelectric conversion unit PD is connected to a potential line having a power supply potential VDD, and the anode thereof is connected to the drain of the reset transistor M1 and the gate of the amplifying transistor M2. This connection node is a floating diffusion FD.

The charges generated in the photoelectric conversion unit PD are accumulated in the floating diffusion FD. The floating diffusion FD has a capacitance, and the potential of the floating diffusion FD changes according to the charge generated in the photoelectric conversion unit PD due to the capacitance.

The source of the reset transistor M1 is connected to a potential line having a reset potential VRES. The drain of the amplifying transistor M2 is connected to a potential line having a power supply potential VDD. The source of the amplifying transistor M2 is connected to the current source 12. The amplifying transistor M2 constitutes a source follower circuit together with the current source 12. The source follower circuit outputs a signal based on the voltage of the floating diffusion FD to the column circuit unit 20. The reset transistor M1 turns on (connected state) to reset the potential of the floating diffusion FD.

The column circuit unit 20 includes an amplifier 22, a clamp capacitor C0, a feedback capacitor Cf1, and switches SW1, SW2, and SW3. Control signals PCM, PCOR, and PADD are input from the control unit 70 to the control terminals of the switches SW1, SW2, and SW3, respectively. The switches SW1, SW2, and SW3 are controlled to turn on (connected state) or turn off (non-connected state) in accordance with these control signals. The control signal en (n) is input from the control unit 70 to the control terminal of the amplifier 22 in the n-th column, and the control signal en (n+1) is input from the control unit 70 to the control terminal of the amplifier 22 in the (n+1)-th column. The amplifier 22 is controlled to be an operating state when the control signals en (n) and en (n+1) are at the high level. Further, the amplifier 22 is controlled such that the output thereof becomes high impedance when the control signals en (n) and en (n+1) are at the low level. That is, the control signals en (n) and en (n+1) are enable signals for controlling the amplifier 22 to be either an operating state or a non-operating state. The amplifier 22, the clamp capacitor C0, and the feedback capacitor Cf1 constitute an amplifier circuit having an analog gain based on the capacitance value of the clamp capacitor C0 and the capacitance value of the feedback capacitor Cf1.

The first terminal of the switch SW1 in the n-th column is connected to the output terminal of the n-th column of the pixel array 10, that is, the connection node between the source of the amplifying transistor M2 and the current source 12 in the n-th column. The second terminal of the switch SW1 is connected to the first terminal of the clamp capacitor C0. The second terminal of the clamp capacitor C0 is connected to the input terminal of the amplifier 22, the first terminal of the switch SW2, and the first terminal of the feedback capacitor Cf1. The second terminal of the switch SW2, the second terminal of the feedback capacitor Cf1, and the output terminal of the amplifier 22 are mutually connected, and the connection node is the output terminal from the column circuit unit 20 to the memory unit 30.

The first terminal of the switch SW3 (first switch) is connected to the connection node of the second terminal of the clamp capacitor C0, the input terminal of the amplifier 22, the first terminal of the switch SW2 and the first terminal of the feedback capacitor Cf1 in the n-th column. The second terminal of the switch SW3 is connected to the connection node of the second terminal of the clamp capacitor C0, the input terminal of the amplifier 22, the first terminal of the switch SW2, and the first terminal of the feedback capacitor Cf1 in the (n+1)-th column That is, the switch SW3 has a function of controlling connection or disconnection between the wiring in the column circuit 21 corresponding to the pixel 11 in the n-th column and the wiring in the column circuit 21 corresponding to the pixel 11 in the (n+1)-th column.

The memory unit 30 includes holding capacitors CTS (n), CTN (n), CTS (n+1), and CTN (n+1) and switches SW4, SW5, SW6, and SW7. These elements constitute a sample and hold circuit. Control signals PTS (n) and PTN (n) are input from the control unit 70 to the control terminals of the switches SW4 and SW5 in the n-th column, respectively. Control signals HSR (n) and HSR (n) are input from the horizontal scanning circuit 40 to the control terminals of the switches SW6 and SW7 in the n-th column, respectively. Control signals PTS (n+1) and PTN (n+1) are input from the control unit 70 to the control terminals of the switches SW4 and SW5 in the (n+1)-th column, respectively. Control signals HSR (n+1) and HSR (n+1) are input from the horizontal scanning circuit 40 to the control terminals of the switches SW6 and SW7 in the (n+1)-th column, respectively. The switches SW4, SW5, SW6, and SW7 are controlled to turn on (connected state) or turn off (non-connected state) in accordance with these control signals. The holding capacitors CTS (n) and CTS (n+1) hold pixel signals, and the holding capacitors CTN (n) and CTN (n+1) hold reset signals.

The output terminal of the n-th column of the column circuit unit 20, that is, the connection node of the second terminal of the switch SW2, the second terminal of the feedback capacitor Cf1, and the output terminal of the amplifier 22 in the n-th column are connected to the first terminal of the switch SW4 in the n-th column and the first terminal of the switch SW5 in the n-th column. The second terminal of the switch SW4 is connected to the first terminal of the holding capacitor CTS (n) and the first terminal of the switch SW6. The second terminal of the holding capacitor CTS (n) is connected to a potential line having a ground potential. The second terminal of the switch SW6 is an output terminal from the memory unit 30 to the common output line 50.

The second terminal of the switch SW5 is connected to the first terminal of the holding capacitor CTN (n) and the first terminal of the switch SW7. The second terminal of the holding capacitor CTN (n) is connected to a potential line having a ground potential. The second terminal of the switch SW7 is an output terminal from the memory unit 30 to the common output line 50.

In the above description, the control signals HSR (n) and HSR (n+1) are supplied from the horizontal scanning circuit 40, and the other control signals are supplied from the control unit 70, but control signals and circuit supplying the control signals are not limited thereto. For example, control signals other than the control signals HSR (n) and HSR (n+1) may be supplied from a control circuit (not illustrated)

such as a vertical scanning circuit or a signal generation circuit which operates based on a timing signal supplied from the control unit 70.

The photoelectric conversion device 1 of the present embodiment can output a signal in either the first mode or the second mode. The first mode is a mode in which signals corresponding to the pixels 11 in each column of the pixel array 10 are output. The second mode is a mode in which a signal is output by an addition readout in which a signal based on a plurality of pixels 11 is added and an addition signal is output, or a thinning readout in which a signal is output from a part of a plurality of pixels 11. In the second mode, the number of output signals is reduced as compared with the first mode. Thus, for example, the first mode may be a high-resolution mode for outputting a high-resolution image, and the second mode may be a low-resolution mode for outputting a low-resolution image. In the following description, it is assumed that addition readout is performed in the second mode unless otherwise specified.

Figure 4:
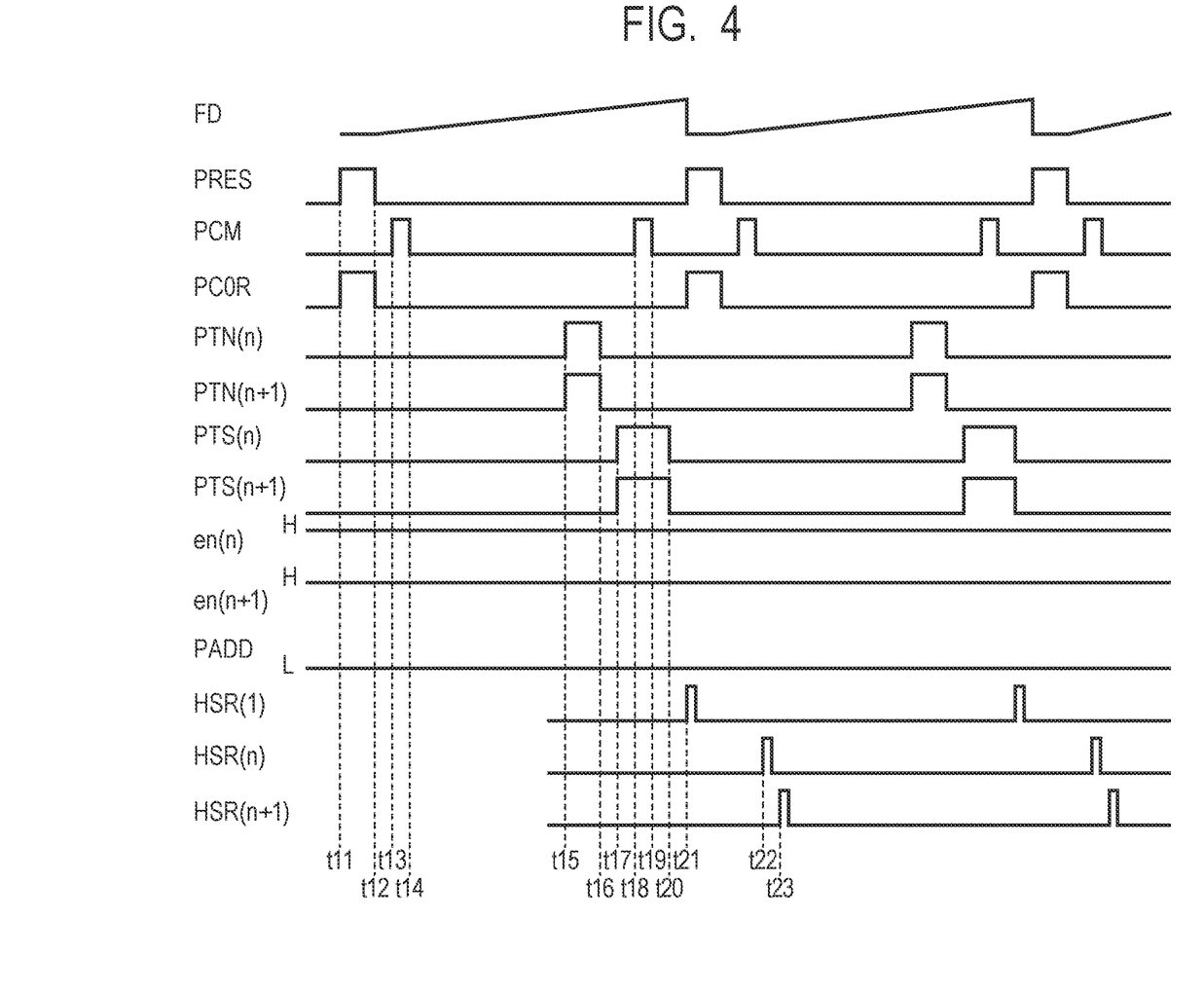
FIG. 4 is a timing chart illustrating driving timing in a first mode of the photoelectric conversion device according to the first embodiment.

First, the driving timing in the first mode will be described. FIG. 4 is a timing chart illustrating the driving timing in the first mode of the photoelectric conversion device 1 according to the present embodiment. FIG. 4 illustrates the levels of the control signals PRES, PCM, PCOR, PTN, PTS, en, PADD, and HSR, and the potential of the floating diffusion FD. For the control signals PTN, PTS, and en, the n-th column and the (n+1)-th column are individually illustrated, and for the control signal HSR, the first column, the n-th column, and the (n+1)-th column are individually illustrated. It is assumed that a control signal having the same level is input to the transistors or switches in the n-th column and the (n+1)-th column for a control signal to which a column number is not assigned.

The control signals en (n) and en (n+1) are at the high level throughout the entire period, and the amplifiers 22 in the n-th column and the (n+1)-th column are in an operating state. The control signal PADD is at the low level throughout the entire period, and the switch SW3 is off.

At time t11, the control signal PRES becomes the high level, and at time t12, the control signal PRES becomes the low level. This operation temporarily turns on the reset transistor M1. Thus, the potential of the floating diffusion FD is reset to a potential based on the reset potential VRES. After time t12, the potential of the floating diffusion FD rises as time elapses due to the charges generated in the photoelectric conversion unit PD by the incident light.

Further, the control signal PCOR becomes the high level at time t11, and the control signal PCOR becomes the low level at time t12. This operation temporarily turns on the switch SW2. Thus, the charges held in the clamp capacitor C0 is reset. In FIG. 4, the control signal PRES and the control signal PCOR are at the high level at the same timing, and the reset of the floating diffusion FD and the clamp capacitor C0 is performed simultaneously, but it is not essential that they are simultaneous. The reset of the clamp capacitor C0 may be performed before the timing of holding a signal in the memory unit 30.

At time t13, the control signal PCM becomes the high level, and at time t14, the control signal PCM becomes the low level. This operation temporarily turns on the switch SW1. Thus, the potential based on the reset state of the pixel 11 is applied to the clamp capacitor C0 and held.

The control signals PTN (n) and PTN (n+1) become the high level at time t15, and the control signals PTN (n) and PTN (n+1) become the low level at time t16. By this operation, the switches SW5 in the n-th column and the (n+1)-th column temporarily turn on. Thus, the reset signal is held in the holding capacitors CTN (n) and CTN (n+1).

At time t17, the control signals PTS (n) and PTS (n+1) become the high level, and the switch SW4 turns on. At time t18, the control signal PCM becomes the high level, and the switch SW1 turns on. At time t19, the control signal PCM becomes the low level, and the switch SW1 turns off. At time t20, the control signals PTS (n) and PTS (n+1) become the low level, and the switch SW4 turns off. By the series of operations, the pixel signal based on the potential of the floating diffusion FD at time t19 is held in the holding capacitors CTS (n) and CTS (n+1).

At time t21, the control signal HSR (1) becomes the high level, and switches SW6 and SW7 in the first column turn on. Thus, the signal held in the holding unit 31 of the first column is output to the common output line 50. Thereafter, the control signal HSR (1) becomes the low level, and the switches SW6 and SW7 in the first column turn off. Thereafter, in the same manner, the control signals HSR (2), HSR (3), . . . corresponding to the second column, the third column, . . . (not illustrated in FIGS. 3 and 4) sequentially become the high level at a constant cycle, and horizontal scanning is performed in which the signals held in the holding units 31 of the respective columns are sequentially output to the common output line 50. That is, time t21 is the start time of horizontal scanning.

Thereafter, at time t22, the control signal HSR (n) becomes the high level, and the switches SW6 and SW7 in the n-th column turn on. Thus, the signal held in the holding unit 31 in the n-th column is output to the common output line 50. Similarly, at time t23, the control signal HSR (n+1) becomes the high level, and the switches SW6 and SW7 in the (n+1)-th column turn on. Thus, the signal held in the holding unit 31 in the (n+1)-th column is output to the common output line 50. In the horizontal scanning period, in parallel with the horizontal scanning, the charge accumulation processing for the next readout is performed by the same processing as the above-described processing from time t11 to time t20.

As described above, in the first mode, the control signal PADD is at the low level throughout the entire period, and the switch SW3 turns off. Accordingly, the signal generated by the pixels 11 in the n-th column is held in the holding unit 31 in the n-th column, and the signal generated by the pixels 11 in the (n+1)-th column is held in the holding unit 31 in the (n+1)-th column. As described above, in the first mode, since the signal output from each pixel 11 is held in the holding units 31 of the corresponding column, the addition readout or the thinning readout of the signal is not performed.

Figure 5:
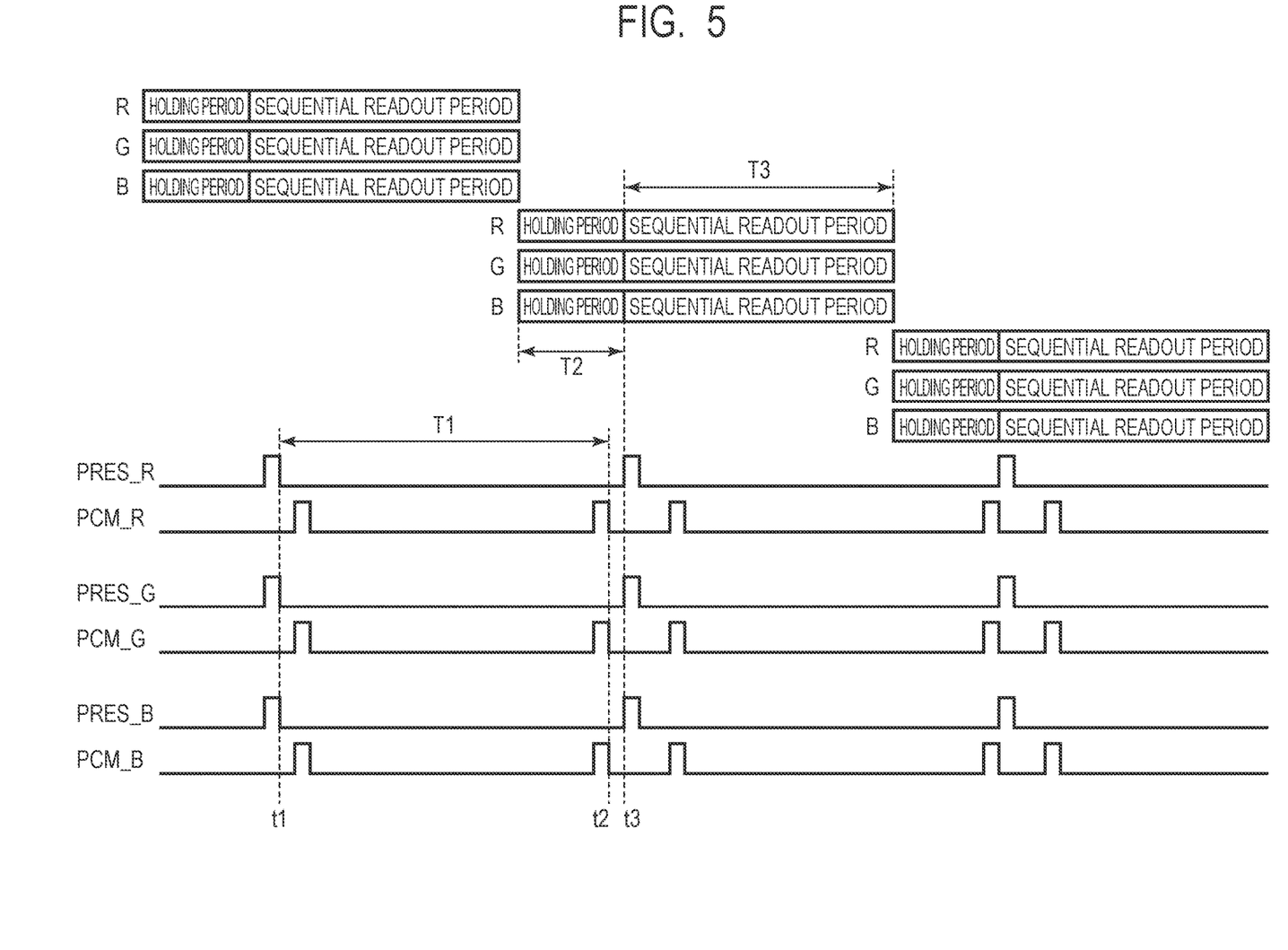
FIG. 5 is a schematic diagram illustrating an outline of a driving method in the first mode of the photoelectric conversion device according to the first embodiment.

FIG. 5 is a schematic diagram illustrating an outline of a driving method in a first mode of the photoelectric conversion device 1 according to the present embodiment. FIG. 5 schematically illustrates the operation of each pixel 11 corresponding to three colors of R, G, and B and the corresponding holding unit 31.

The timing chart illustrated in the lower part of FIG. 5 focuses on the control signals PRES and PCM among the plurality of control signals illustrated in FIG. 4. Here, subscripts of R, G, and B attached to the control signals in FIG. 5 indicate control signals input to the pixels 11 of the three colors of R, G, and B, respectively.

A block illustrated in the upper part of FIG. 5 illustrates an outline of processing performed at each time in the timing chart in the lower part and a period thereof. That is, a block of "holding period" indicates a period during which a pixel signal and a reset signal are output from the pixel 11 and held in the holding unit 31. A block of "sequential readout period" indicates a horizontal scanning period during which the pixel signal and the reset signal held in the holding unit 31 are sequentially output to the common output line 50. The subscripts of R, G, and B attached to the block indicate the processing corresponding to which of the pixels 11 of the three colors of R, G, and B.

The time t1 is a time when the control signals PRES_R, PRES_G, and PRES_B become the low level and the reset transistor M1 turns off, whereby the reset of the pixel 11 is released and accumulation of charges is started. That is, time t1 in FIG. 5 corresponds to time t12 in FIG. 4. The time t2 is a time when the control signals PCM_R, PCM_G, and PCM_B become the low level and the switch SW1 turns off, whereby the signal output from the pixel 11 ends. That is, time t2 in FIG. 5 corresponds to time t19 in FIG. 4. A period T1 from time t1 to time t2 is an accumulation period during which charges generated in the photoelectric conversion unit PD in response to incident light are accumulated. As illustrated in FIG. 5, since the period T1 is common to all the pixels 11 of the three colors R, G, and B, charges are accumulated in parallel in the same accumulation period.

In FIG. 5, a period T2 in which a block of "holding period" of R, G, and B is illustrated corresponds to a period from time t15 to time t21 in FIG. 4. As illustrated in FIG. 5, the period T2 is common to all three colors of R, G, and B. Accordingly, the pixel signal and the reset signal are output from the pixels 11 of the three colors R, G, and B in parallel in the same period, and are held in the holding unit 31.

In FIG. 5, a period T3 in which the blocks of R, G, and B "sequential readout period" are illustrated corresponds to a period after time t21 in FIG. 4. That is, the time t3, which is the start time of the period T3, corresponds to the time t21 in FIG. 4. As illustrated in FIG. 5, the period T3 is common to all three colors of R, G, and B. Therefore, the pixel signal and the reset signal are sequentially output to the common output line 50 in parallel in the same period from the holding unit 31 corresponding to the pixels 11 of the three colors R, G, and B.

As illustrated in FIG. 2, the pixels 11 of R, G, and B are arranged at intervals in the sub-scanning direction Y. Accordingly, in the signals of the respective colors output at the same time, a positional deviation corresponding to the interval between the pixels 11 occurs for each color. Therefore, in order to correct the positional deviation, a signal processing circuit or the like which can be provided in the photoelectric conversion device 1 or the image reading device 2 may perform a correction process of generating an image by shifting the phase for each color by the number of frames corresponding to the interval between the pixels 11. For example, if the interval in the sub-scanning direction Y of the pixel 11 is d, the R signal is delayed by a time corresponding to the interval 2d, and the G signal is delayed by a time corresponding to the interval d, whereby the positional deviation for each color can be corrected.

Next, the driving timing in the second mode will be described. In the present embodiment, it is assumed that addition readout of two columns is performed in the second mode. As a result, the resolution of the second mode becomes half the resolution of the first mode. For example, when the interval between the pixels 11 is 42 µm, the resolution in the main scanning direction X in the first mode is 600 dpi, and the resolution in the main scanning direction X in the second mode is 300 dpi. On the other hand, in the sub-scanning direction Y, since the resolution determined by the physical interval between the pixels 11 remains equivalent to 600 dpi, the positional deviation correction may be insufficient only by temporally delaying the signals of the respective colors as described above. In the driving method of the second mode of the present embodiment, the accumulation period is shifted for each color, whereby the positional deviation correction can be realized in the addition readout.

Figure 6:
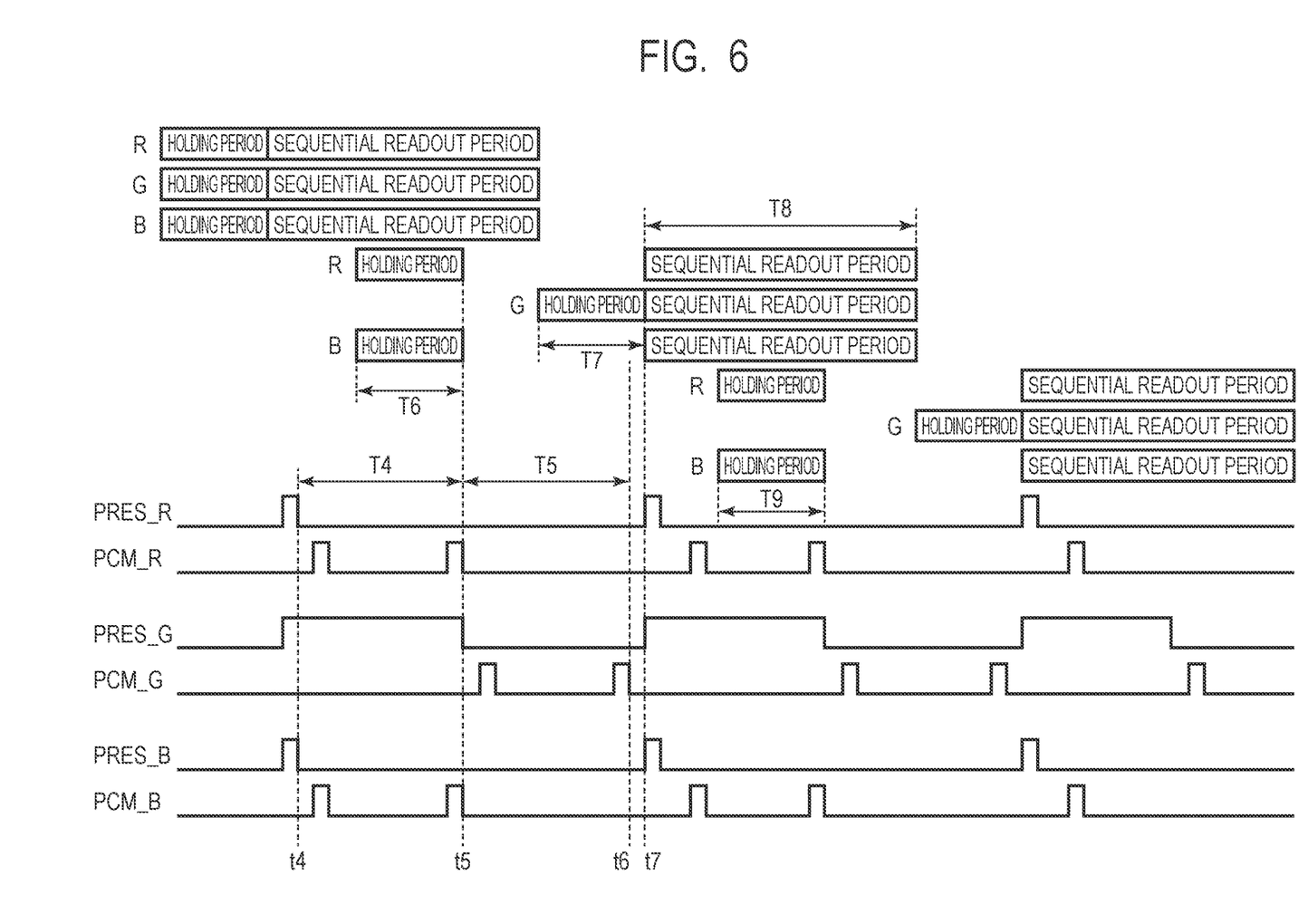
FIG. 6 is a schematic diagram illustrating an outline of a driving method in a second mode of the photoelectric conversion device according to the first embodiment.

FIG. 6 is a schematic diagram illustrating an outline of a driving method in a second mode of the photoelectric conversion device 1 according to the present embodiment. The notations of the blocks and timing charts illustrated in FIG. 6 are the same as those in FIG. 5, and therefore the description thereof will be omitted. As illustrated in FIG. 6, the difference from FIG. 5 of FIG. 6 is that the signal holding period indicated by the block of "holding period" of the pixels 11 of R and B is different from the signal holding period indicated by the block of "holding period" of the pixel 11 of G.

At time t4, the control signals PRES_R and PRES_B become the low level, and the reset transistors M1 of the pixels 11 of R and B turn off. Thus, reset of the pixels 11 of R and B is released, and accumulation of charges in the pixels 11 of R and B is started. At time t5, the control signals PCM_R and PCM_B become the low level, and the switches SW1 corresponding to the pixels 11 of R and B turn off. Thus, the signal output from the pixels 11 of R and B is completed. A period T4 from time t4 to time t5 is an accumulation period corresponding to the pixels 11 of R and B.

At time t5, the control signal PRES_G becomes the low level, and the reset transistor M1 of the pixel 11 of G turns off. Thus, reset of the pixel 11 of G is released, and accumulation of charges of the pixel 11 of G is started. At time t6, the control signal PCM_G becomes the low level, and the switch SW1 corresponding to the pixel 11 of G turns off. Thus, the signal output from the pixel 11 of G ends. A period T5 from time t5 to time t6 is an accumulation period corresponding to the pixel 11 of G.

As illustrated in FIG. 6, the pixels 11 of R and B and the pixels 11 of G have different accumulation periods. In other words, the period T1, which is the accumulation period in the first mode, is divided into two, that is, the period T4, which is the first half in which the pixels 11 of R and B perform accumulation, and the period T5, which is the second half in which the pixels 11 of G perform accumulation, in the second mode. Thus, a period T6 in which the block of "holding period" of R and B is illustrated and a period T7 in which the block of "holding period" of G is illustrated are also divided into different periods.

After time t7, similarly to FIG. 5, the pixel signal and the reset signal are output from the pixels 11 of the three colors of R, G, and B in parallel in the same period, and are held in the holding unit 31. A period T8 in which the blocks of "sequential readout period" of R, G, and B are illustrated is common to the three colors of R, G, and B as in FIG. 5.

In the period T8, the accumulation of the pixels 11 of R and B for the next readout is started in the same manner as in the periods T4 and T5. In a period T9 in which a block of "holding period" of R and B is illustrated, a signal is held in the holding unit 31 corresponding to the pixels 11 of R and B. That is, the period T8 and the period T9 overlap, and the holding of the signal in the holding unit 31 and the output of the signal from the holding unit 31 are performed in parallel in the same period. A specific method for performing this operation will be described later with reference to FIG. 7.

In FIG. 6, the length of the period T4 and the length of the period T5 are the same. Thus, the lengths of the accumulation periods of the pixels 11 of the respective colors can be made the same. However, depending on other driving conditions, the length of the period T4 and the length of the period T5 may not be the same.

During the period from time t4 to time t5, the control signal PRES_G is maintained at the high level, but this is not essential. It is sufficient if the reset of the pixel 11 of G is performed before the start of accumulation in the period T5.

Figure 7:
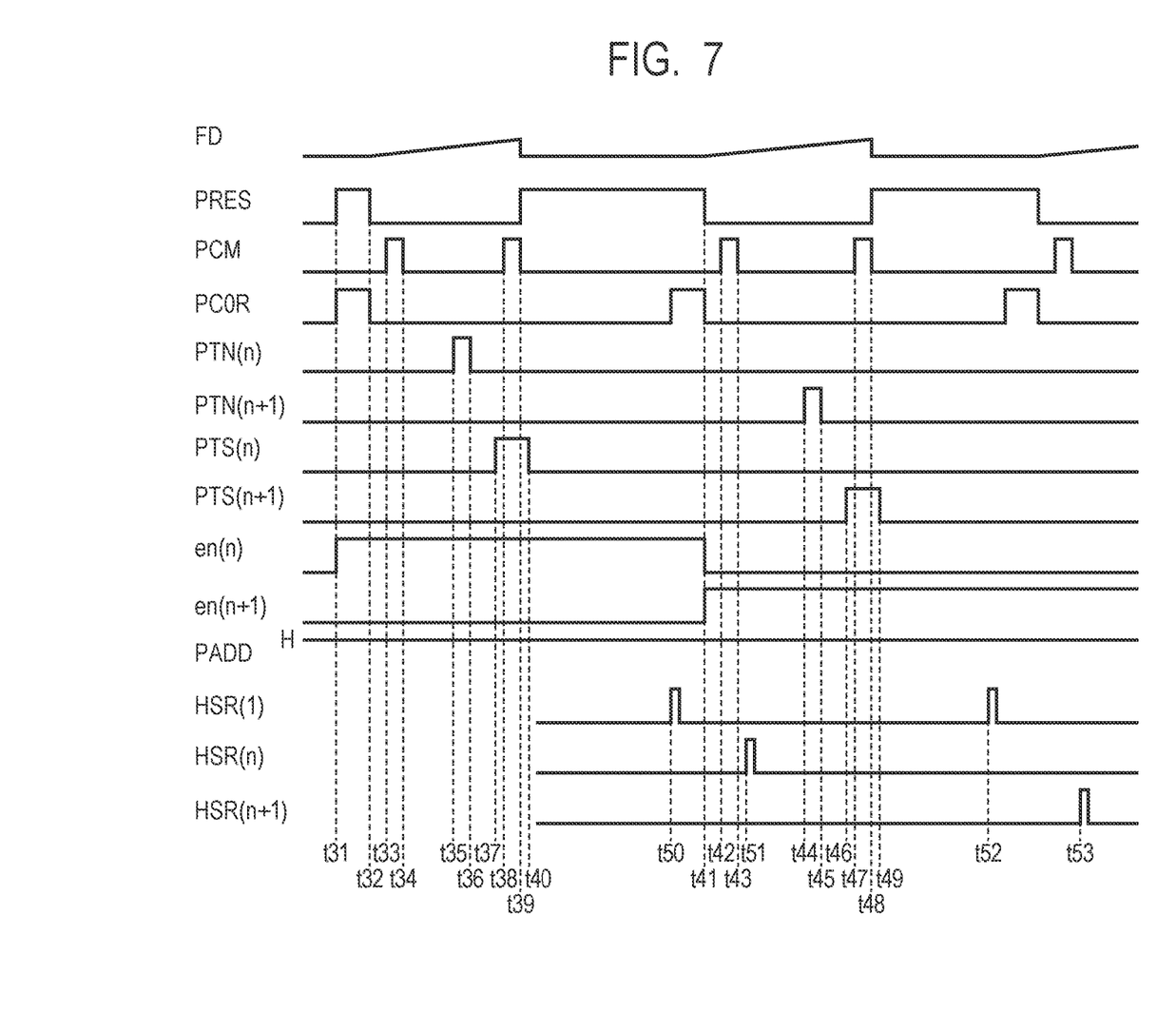
FIG. 7 is a timing chart illustrating driving timing in the second mode of the photoelectric conversion device according to the first embodiment.

FIG. 7 is a timing chart illustrating the driving timing in the second mode of the photoelectric conversion device 1 according to the present embodiment. FIG. 7 illustrates the operation of the pixels 11 of R and B and the corresponding column circuits 21 and holding units 31. In the following description, the description of portions common to those in FIG. 4 may be omitted or simplified.

The control signal PADD is at the high level throughout the entire period, and the switch SW3 is on. Therefore, the column circuits 21 of the n-th column and the (n+1)-th column are short-circuited at the node between the clamp capacitor C0 and the amplifier 22. Thus, the amplifiers 22 in the n-th column and the (n+1)-th column add the signals from the pixels 11 in the n-th column and the (n+1)-th column and output added signals.

The control signal en (n) is at the high level during a period from time t31 to time t41, and at a low level during other periods. Further, the control signal en (n+1) is at the high level in a period after time t41 and is at the low level in other periods. Therefore, during the period from time t31 to time t41, the amplifier 22 in the n-th column is in the operating state, and the amplifier 22 in the (n+1)-th column is in the high impedance state. That is, in this period, the added signal is held in the holding unit 31 corresponding to the pixels 11 in the n-th column. During the period after time t41, the amplifier 22 of the n-th column is in the high impedance state, and the amplifier 22 of the (n+1)-th column is in the operating state. That is, in this period, the added signal is held in the holding unit 31 corresponding to the pixels 11 in the (n+1)-th column. As described above, in the second mode, the added signal of the n-th column and the (n+1)-th column is selectively held in the holding unit 31 of one of the n-th column and the (n+1)-th column.

The period from time t31 to time t39 corresponds to the period T4 in FIG. 6. Since the operation in this period is substantially the same as the operation from time t11 to time t20 in FIG. 4, the description thereof will be omitted. The period from time t40 to time t50 corresponds to the period T5 in FIG. 6. This period is the accumulation period in the pixel 11 of G, and the operations related to the pixels 11 of R and B illustrated in FIG. 6 are not particularly performed.

The period after time t50 corresponds to the period after time t7 in FIG. 6, that is, the period T8. At time t50, control signal HSR (1) becomes the high level, and switches SW6 and SW7 in the first column turn on. Thus, the signal held in the holding unit 31 of the first column is output to the common output line 50. At this time, horizontal scanning is started. At time t51, the control signal HSR (n) becomes the high level, and the switches SW6 and SW7 in the n-th column turn on. Thus, the signal held in the holding unit 31 of the n-th column is output to the common output line 50. The signal output at this time is the addition signal of the n-th column and the (n+1)-th column held in the holding unit 31 corresponding to the pixels 11 of the n-th column during the period from time t31 to time t39.

In parallel with the output of the addition signal, charge accumulation in the pixel 11 and signal holding in the holding unit 31 are performed from time t41 to time t49. At this time, since the amplifier 22 of the (n+1)-th column is in the operating state, the added signal is held in the holding unit 31 corresponding to the pixels 11 of the (n+1)-th column. The addition signal is output to the common output line 50 at time t53 in the horizontal scanning started at time t52.

In the second mode, addition reading is performed, so that no signal is output from some columns. Although the pulses at which the HSR (1) becomes the high level are illustrated at times t50 and t52 in FIG. 7, the HSR (1) may not actually become the high level at one or both of times t50 and t52. That is, HSR (1) in FIG. 7 is illustrated to indicate the start time of horizontal scanning, and actual driving of the first column may not be as illustrated in FIG. 7.

As described above, during the period from time t50 to time t49 in the second mode of the present embodiment, the holding of the signal to the holding unit 31 corresponding to the pixel 11 in the (n+1)-th column and the output of the signal from the holding unit 31 corresponding to the pixel 11 in the n-th column are performed in parallel. When addition readout of signals is performed, a signal is not output from some columns, so that there is a holding unit 31 which is not used to output the signal. In the present embodiment, a signal for outputting a signal in the next period is held in the holding unit 31 of such a column, whereby the holding of a signal in the holding unit 31 and the output of a signal from the holding unit 31 can be performed in parallel in the same period. As a result, the accumulation period can be shifted for each color, and the positional deviation correction can be realized even in the second mode in which addition reading or the like is performed.

In the above-described method, since the sample and hold circuit for holding signals for horizontal scanning also functions as an intermediate memory for shifting the accumulation time, it is not necessary to provide an additional intermediate memory for shifting the accumulation period for each color. Therefore, in the present embodiment, the influence of an increase in the circuit scale or the like, which may be caused by applying the driving method in which the accumulation period is shifted for each color, is reduced.

As described above, according to the present embodiment, the photoelectric conversion device 1 capable of correcting positional deviation during scanning is provided. Further, by applying such a photoelectric conversion device 1, an image reading device 2 in which image quality degradation due to positional deviation during scanning is reduced is provided.

Although the operation corresponding to the pixel 11 of G is not illustrated in FIG. 7, this operation is the same as the operation corresponding to the pixel 11 of R and B, except that the timing of the accumulation period or the like is different as illustrated in FIG. 6.

Further, in the case where the second mode is the thinning readout mode, the second mode is the same as that of FIG. 7 except that the control signal PADD is at the low level throughout the entire period and the switch SW3 is off. In this case, the holding unit 31 holds not the addition signals of two columns but the signals based on the pixels 11 of only the corresponding columns. Also in this case, the same effect can be acquired.

As illustrated in FIG. 7, the signal is held in the holding unit 31 of the n-th column during the period from time t31 to time t40, and the signal is held in the holding unit 31 of the (n+1)-th column during the period from time t41 to time t49 which is the next readout cycle. At time t51, a signal is output from the holding unit 31 of the n-th column, and at time t53 included in the next readout cycle, a signal is output from the holding unit 31 of the (n+1)-th column. That is, the first operation in which the output of the signal from the holding unit 31 of the first column and the holding of the signal in the holding unit 31 of the second column are performed in parallel and the second operation in which the output of the signal from the holding unit 31 of the second column and the holding of the signal in the holding unit 31 of the first column are performed in parallel are switched for each readout cycle. By adopting such a driving method, the processing of the present embodiment can be continuously repeated.

Second Embodiment

The photoelectric conversion device 1 of the present embodiment is a modified example in which a switch for controlling connection or disconnection of wiring between columns is added to a node between the column circuit unit 20 and the memory unit 30 in the configuration of the first embodiment. In the description of the present embodiment, the description of elements common to the first embodiment may be omitted or simplified.

Figure 8:
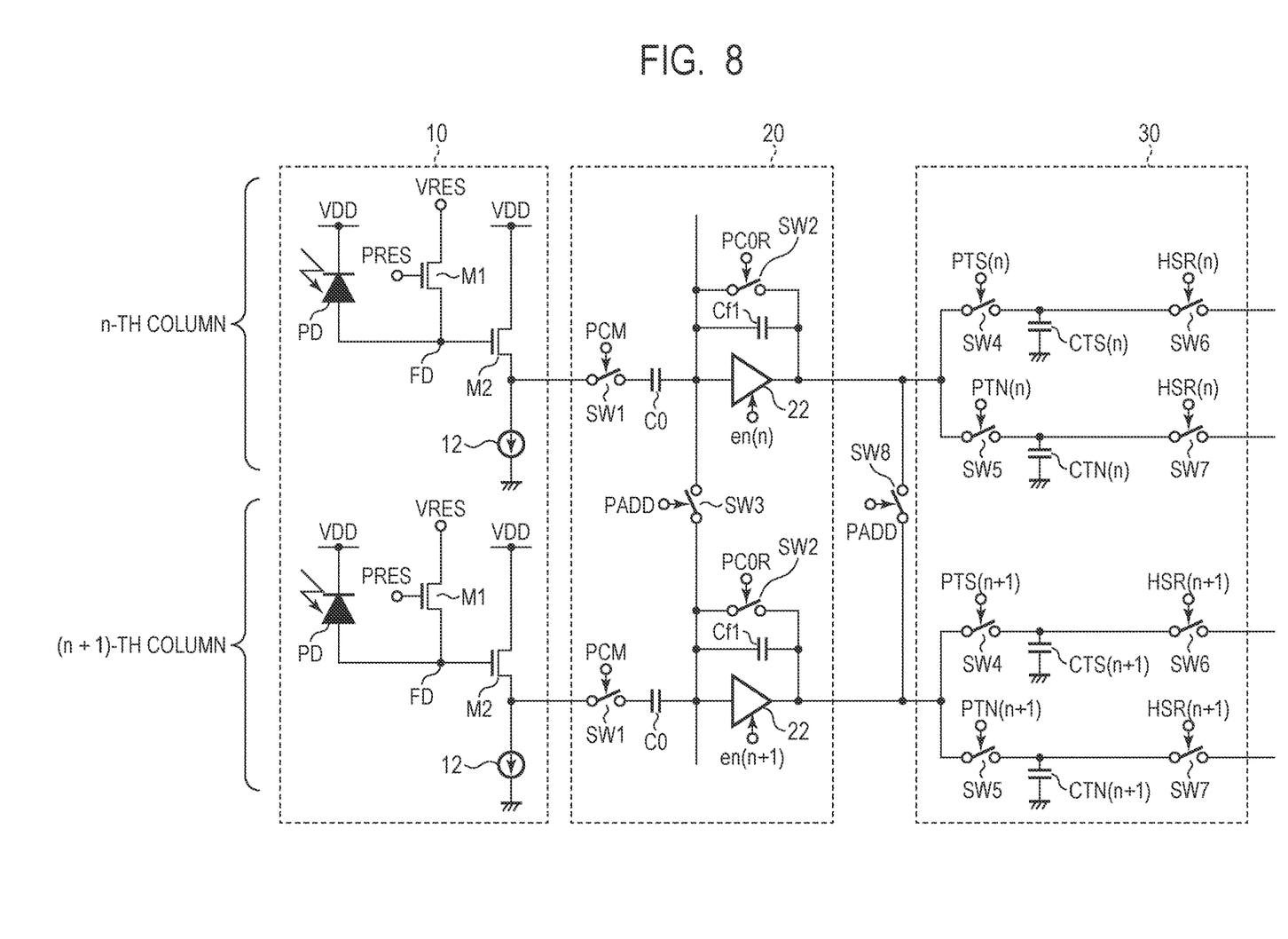
FIG. 8 is a circuit diagram illustrating a configuration of a pixel array, a column circuit unit, and a memory unit according to a second embodiment.

FIG. 8 is a circuit diagram illustrating a configuration of the pixel array 10, the column circuit unit 20, and the memory unit 30 according to the second embodiment. In the circuit of FIG. 8, a switch SW8 is further arranged in addition to the circuit of FIG. 3. The control signal PADD is input to the control terminal of the switch SW8 similarly to the switch SW3.

The first terminal of the switch SW8 (second switch) is connected to the connection node of the second terminal of the switch SW2 in the n-th column, the second terminal of the feedback capacitor Cf1, the output terminal of the amplifier 22, and the first terminals of the switches SW4 and SW5. The second terminal of the switch SW8 is connected to the connection node of the second terminal of the switch SW2 in the (n+1)-th column, the second terminal of the feedback capacitor Cf1, the output terminal of the amplifier 22, and the first terminals of the switches SW4 and SW5. That is, the switch SW8 has a function of controlling connection or disconnection between the wiring between the column circuit 21 and the memory unit 30 corresponding to the pixel 11 in the n-th column and the wiring between the column circuit 21 and the memory unit 30 corresponding to the pixel 11 in the (n+1)-th column.

Next, the photoelectric conversion device 1 of the present embodiment can output a signal in either the first mode or the second mode as in the first embodiment. The driving timing according to the driving method in the first mode is the same as that illustrated in FIGS. 4 and 5. That is, as in the first embodiment, the control signal PADD is at the low level and the switch SW8 is off over the entire period. Therefore, since the driving method in the first mode is the same as that in the first embodiment, the description thereof will be omitted.

Figure 9:
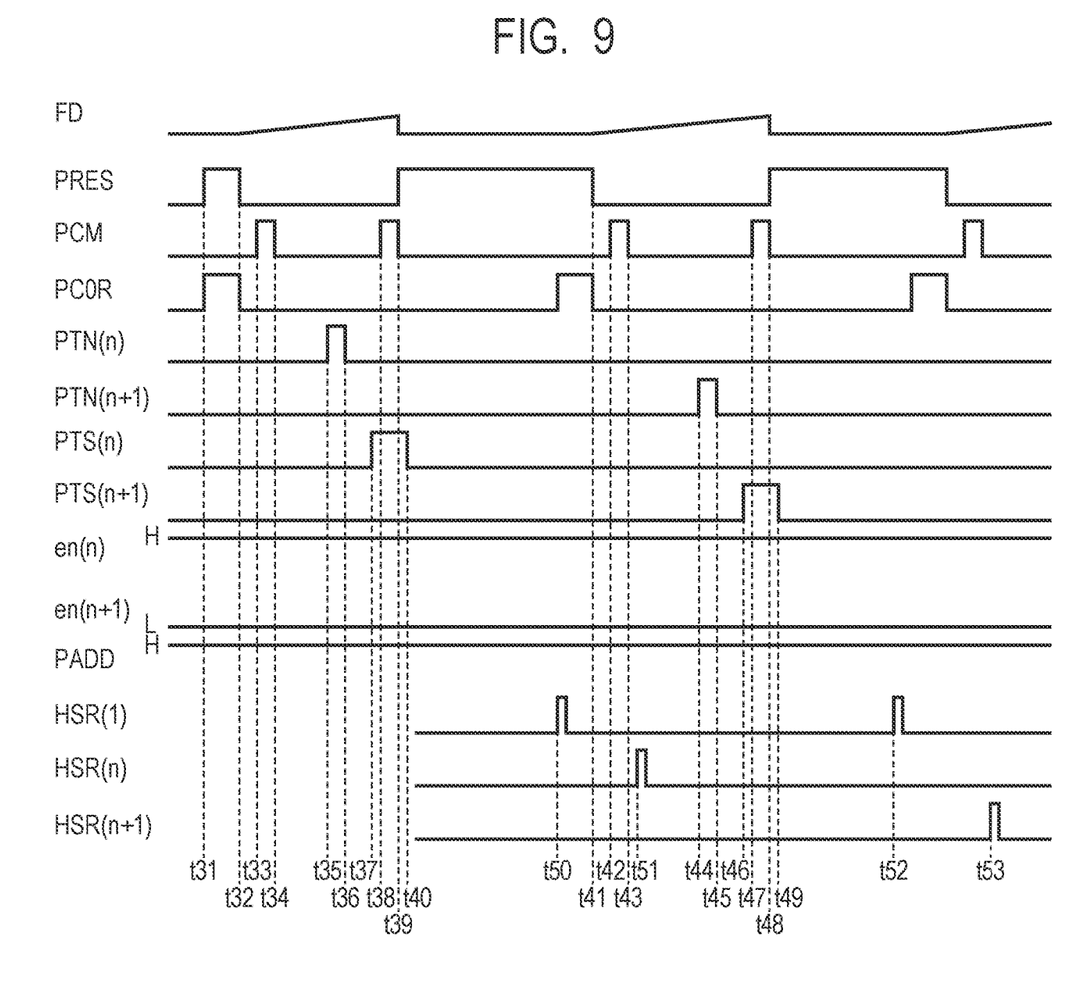
FIG. 9 is a timing chart illustrating driving timing in a second mode of the photoelectric conversion device according to the second embodiment.

A driving method in the second mode will be described with reference to FIG. 9. FIG. 9 is a timing chart illustrating the driving timing in the second mode of the photoelectric conversion device 1 according to the present embodiment. The difference from FIG. 7 is that the control signal en (n) is at the high level throughout the entire period, and the control signal en (n+1) is at the low level throughout the entire period. Therefore, the amplifier 22 in the n-th column is in an operating state over the entire period, and the amplifier 22 in the (n+1)-th column is in a high impedance state over the entire period.

In the present embodiment, the amplifier 22 of the n-th column operates both during the period during which the signal is held in the holding unit 31 corresponding to the pixel 11 of the n-th column and during the period during which the signal is held in the holding unit 31 corresponding to the pixel 11 of the (n+1)-th column. Accordingly, variations in signal levels caused by differences in signal paths such as differences in gain of the amplifier circuit are reduced as compared with the configuration of the first embodiment. As described above, according to the present embodiment, in addition to the effect similar to that of the first embodiment, the variation in the signal level caused by the difference in signal path in the second mode is reduced.

Also in the circuit configuration of the present embodiment, the same control signals en (n) and en (n+1) of the first embodiment may be applied to the driving timings of the control signals en (n) and en (n+1). Also in this case, the same effect as that of the first embodiment can be acquired.

Third Embodiment

The photoelectric conversion device 1 of the present embodiment is a modified example in which the column circuit unit 20 in the configuration of the second embodiment functions as an amplifier circuit having a variable analog gain. In the description of the present embodiment, the description of elements common to those of the second embodiment may be omitted or simplified.

Figure 10:
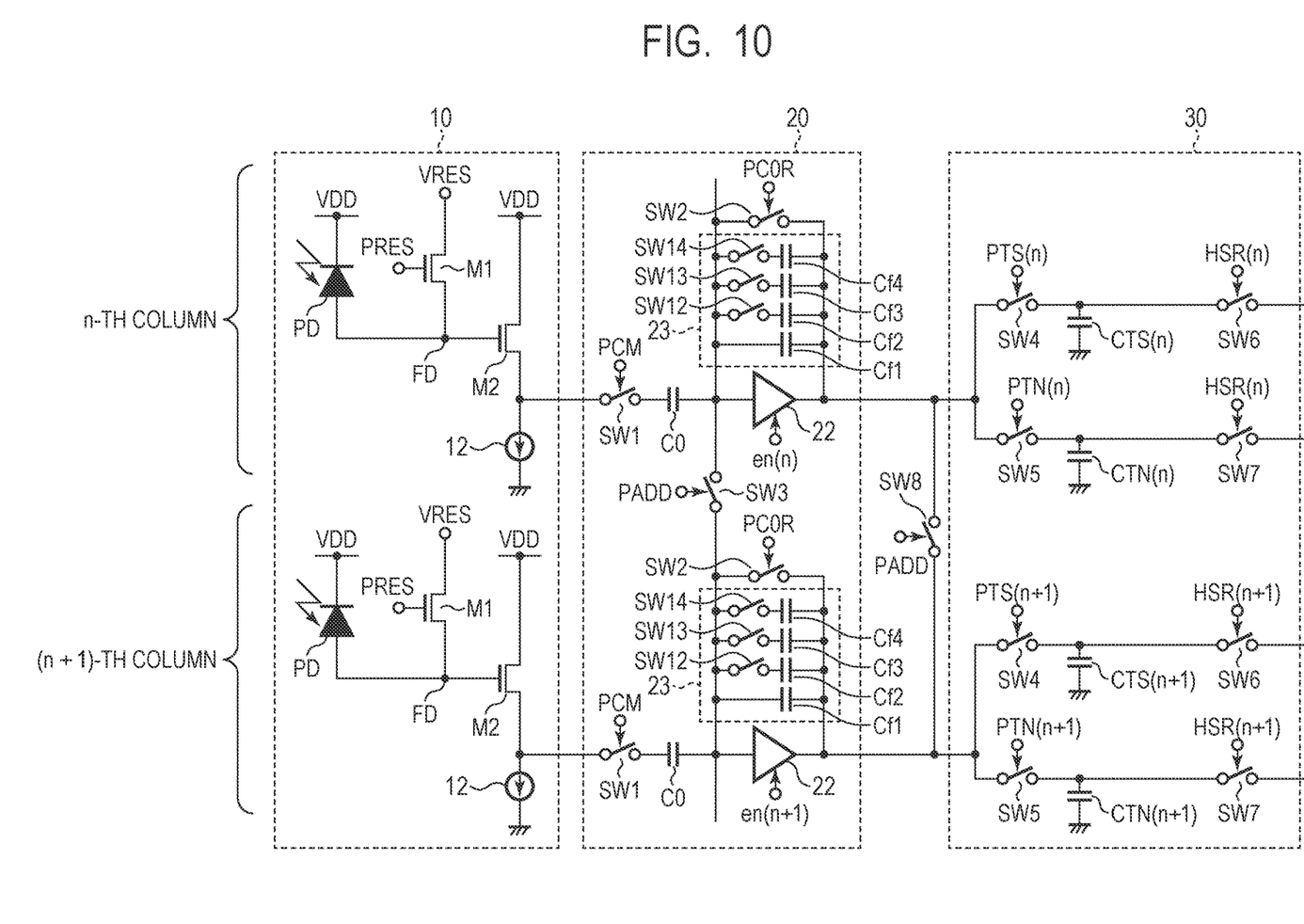
FIG. 10 is a circuit diagram illustrating a configuration of a pixel array, a column circuit unit, and a memory unit according to a third embodiment.

FIG. 10 is a circuit diagram illustrating a configuration of the pixel array 10, the column circuit unit 20, and the memory unit 30 according to the third embodiment. In the circuit of FIG. 10, the feedback capacitor Cf1 in the circuit of FIG. 8 is modified into the gain varying unit 23. The gain varying unit 23 has a function of varying the gain of the amplifier circuit including the amplifier 22, the clamp capacitor C0, and the capacitance in the gain varying unit 23.

The gain varying unit 23 includes feedback capacitors Cf1, Cf2, Cf3, and Cf4 and switches SW12, SW13, and SW14. The connection relationship of the feedback capacitor Cf1 is the same as that in FIG. 8. The first terminals of the switches SW12, SW13, and SW14 are connected to the first terminal of the feedback capacitor Cf1. The second terminals of the switches SW12, SW13, and SW14 are connected to the first terminals of feedback capacitors Cf2, Cf3, and Cf4, respectively. The second terminals of the feedback capacitors Cf2, Cf3, and Cf4 are connected to the second terminal of the feedback capacitor Cf1. Control signals for controlling the switches SW12, SW13, and SW14 are input from the control unit 70. Although three pairs of switches and feedback capacitors are included in the gain varying unit 23 in FIG. 10, the number of pairs of switches and feedback capacitors that can be included in the gain varying unit 23 is not limited to those illustrated in FIG. 10.

By controlling each of the switches SW12, SW13, and SW14, the number of the plurality of feedback capacitors Cf1, Cf2, Cf3, and Cf4 included in the gain varying unit 23 connected in parallel is changed. As a result, the combined capacitance in the gain varying unit 23 changes, and the gain of the amplifier circuit including the amplifier 22, the clamp capacitor C0, and the capacitance in the gain varying unit 23 changes.

As an example, it is assumed that the capacitance values of the feedback capacitors Cf1, Cf2, Cf3, and Cf4 are the same, the gain when all the switches SW12, SW13, and SW14 turn off is G1, and the gain when all the switches SW12, SW13, and SW14 turn on is G2. At this time, G1/G2 is 4, and the gain can be changed four times in accordance with the control of the switches SW12, SW13, and SW14.

Thus, in the present embodiment, in addition to the same effects as those of the first embodiment or the second embodiment, the analog gain of the signal can be changed.

In the driving method in the second mode as illustrated in FIG. 9, since the accumulation time is half that in the first mode, the signal level is reduced to half. When the driving method of the second mode is applied in this manner, the signal level may decrease. In such a case, in the present embodiment, the signal level can be increased by controlling the gain varying unit 23 to increase the gain. In one embodiment, the gain varying unit 23 is controlled so that the analog gain in the second mode is higher than that in the first mode, and it is possible to reduce the influence of the decrease in accumulation time due to the application of the driving method in the second mode.

In the present embodiment, an example is illustrated in which the feedback capacitor Cf1 in the circuit of FIG. 8 is replaced by the gain varying unit 23 but the feedback capacitance Cf1 in the circuit of FIG. 3 may be replaced with the gain varying unit 23, and the same effect can be acquired.

Modified Embodiments

The disclosure is not limited to the above-described embodiments, and various modifications are possible. For example, an example in which a configuration of a part of any embodiment is added to another embodiment or an example in which a configuration of a part of another embodiment is substituted is also an embodiment of the disclosure.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-038417, filed Mar. 10, 2021, which is hereby incorporated by reference herein in its entirety.

What is claimed is:

1. A photoelectric conversion device comprising:
a pixel array including a plurality of pixels each outputting a signal corresponding to incident light and arranged in a plurality of columns in a first direction;
a holding unit arranged corresponding to each of the plurality of pixels; and
a control unit that at a timing synchronized with a relative position between the plurality of pixels and an imaging target in a second direction orthogonal to the first direction, performs control of reading signals from the plurality of pixels and holding them in the holding unit and control of outputting a signal from the holding unit,
wherein the control unit is configured to perform control in either a first mode or a second mode,
wherein in the first mode, the control unit performs control such that a signal output from each of the plurality of pixels is held in the corresponding holding unit, and
wherein in the second mode, the control unit performs control of outputting a signal from the holding unit corresponding to a pixel in a first column and control of holding a signal based on a pixel in the first column in the holding unit corresponding to a pixel in a second column in parallel in a same period.

2. The photoelectric conversion device according to claim 1,
wherein the plurality of pixels are further arranged in a plurality of rows in the second direction,
wherein a plurality of pixels arranged in a same row of the plurality of pixels have color filters of a same color, and
wherein pixels in a first row and pixels in a second row of the plurality of pixels have color filters of different colors from each other.

3. The photoelectric conversion device according to claim 2,
wherein the control unit performs control for simultaneously outputting signals from pixels arranged on the same row.

4. The photoelectric conversion device according to claim 2,
wherein in the first mode, the control unit performs control for simultaneously outputting signals from pixels arranged in different rows.

5. The photoelectric conversion device according to claim 2,
wherein in the second mode, the control unit performs control for outputting signals from pixels arranged in different rows at different timings.

6. The photoelectric conversion device according to claim 2,
wherein the control unit performs control such that a charge accumulation period based on the incident light in pixels of the first row and a charge accumulation period based on the incident light in pixels of the second row are different from each other.

7. The photoelectric conversion device according to claim 6,
wherein a length of the accumulation period in pixels of the first row is the same as a length of the accumulation period in pixels of the second row.

8. The photoelectric conversion device according to claim 6, wherein the control unit performs control such that the accumulation period in pixels of the second row starts after the accumulation period in pixels of the first row ends.

9. The photoelectric conversion device according to claim 1,
wherein in the second mode, the control unit switches a first operation and a second operation for each readout cycle,
wherein in the first operation, the control unit performs control of outputting a signal from the holding unit corresponding to pixels of the first column and control of holding a signal based on pixels of the first column in the holding unit corresponding to pixels of the second column in parallel, and
wherein in the second operation, the control unit performs control of outputting a signal from the holding unit corresponding to pixels of the second column and control of holding a signal based on pixels of the second column in the holding unit corresponding to pixels of the first column in parallel.

10. The photoelectric conversion device according to claim 1 further comprising a column circuit arranged corresponding to each of the plurality of pixels, wherein the column circuit reads signals from the plurality of pixels and lets the holding unit hold the signals.

11. The photoelectric conversion device according to claim 10,
wherein the column circuit includes a first switch that controls connection or disconnection between wiring corresponding to pixels of the first column and wiring corresponding to pixels of the second column.

12. The photoelectric conversion device according to claim 11,
wherein in the first mode, the first switch is controlled to be in a non-connected state and in the second mode, the first switch is controlled to be in a connected state.

13. The photoelectric conversion device according to claim 10 further comprising a second switch that controls, at a node between the column circuit and the holding unit, connection or disconnection between wiring corresponding to pixels of the first column and wiring corresponding to pixels of the second column.

14. The photoelectric conversion device according to claim 13,
wherein in the first mode, the second switch is controlled to be in a non-connected state, and in the second mode, the second switch is controlled to be in a connected state.

15. The photoelectric conversion device according to claim 10,
wherein the column circuit includes an amplifier circuit having a variable analog gain.

16. The photoelectric conversion device according to claim 15,
wherein an analog gain of the amplifier circuit in the second mode is higher than an analog gain of the amplifier circuit in the first mode.

17. The photoelectric conversion device according to claim 1,
wherein a resolution of an image acquired in the second mode is lower than a resolution of an image acquired in the first mode.

18. The photoelectric conversion device according to claim 1,
wherein in the second mode, a signal held in the holding unit is an addition signal of pixels of the first column and pixels of the second column.

19. An image reading device comprising:
the photoelectric conversion device according to claim 1; and
an optical system that guides reflected light from the imaging target to the photoelectric conversion device.

20. A method of controlling a photoelectric conversion device including a pixel array including a plurality of pixels each outputting a signal corresponding to incident light and arranged in a plurality of columns in a first direction and a holding unit arranged corresponding to each of the plurality of pixels, the method comprising:
at a timing synchronized with a relative position between the plurality of pixels and an imaging target in a second direction orthogonal to the first direction, reading signals from the plurality of pixels and holding them in the holding unit; and
outputting a signal from the holding unit,
wherein the photoelectric conversion device performs control in either a first mode or a second mode,
wherein in the first mode, a signal output from each of the plurality of pixels is held in the corresponding holding unit, and
wherein in the second mode, outputting a signal from the holding unit corresponding to a pixel in a first column and holding a signal based on a pixel in the first column in the holding unit corresponding to a pixel in a second column are performed in parallel in a same period.

* * * * *